(12) United States Patent
Schwartz et al.

(10) Patent No.: US 7,307,239 B2
(45) Date of Patent: Dec. 11, 2007

(54) WELDING POWER SUPPLY WITH LAMINATED BUS

(75) Inventors: Brian A. Schwartz, Appleton, WI (US); Daniel G. Krieck, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 296 days.

(21) Appl. No.: 10/993,276

(22) Filed: Nov. 19, 2004

(65) Prior Publication Data

US 2006/0110987 A1    May 25, 2006

(51) Int. Cl.
*B23K 9/10* (2006.01)

(52) U.S. Cl. .................................... 219/130.1

(58) Field of Classification Search ............. 219/130.1; 174/70 B, 117 F, 117 FF
See application file for complete search history.

(56) References Cited

U.S. PATENT DOCUMENTS

| | | | | |
|---|---|---|---|---|
| 3,614,297 A | * | 10/1971 | Carlson | 174/70 B |
| 5,422,440 A | * | 6/1995 | Palma | 174/70 B |
| 5,642,260 A | | 6/1997 | Sigl | |
| 5,783,799 A | | 7/1998 | Geissler | |
| 6,815,639 B2 | | 11/2004 | Geissler | |
| 7,102,256 B2 | * | 9/2006 | Murakami | 174/117 F |

* cited by examiner

*Primary Examiner*—Clifford C. Shaw
(74) *Attorney, Agent, or Firm*—George R. Corrigan

(57) ABSTRACT

A method and apparatus for welding with a bus is disclosed. The bus preferably is laminated, with two conductive plates separated by an insulator plate. The bus preferably is disposed in a housing without airflow.

28 Claims, 2 Drawing Sheets

WELDING POWER SUPPLY WITH LAMINATED BUS

FIELD OF THE INVENTION

The present invention relates generally to the art of welding-type power supplies. More specifically, it relates to welding-type power supplies that have a bus in the power circuit.

BACKGROUND OF THE INVENTION

There are many known welding-type power supply designs. (Welding-type power supply, as used herein, includes power supplies used in welding, heating cutting, and other similar high current applications.) Some of those designs have an input rectifier, followed by a converter, followed by an output circuit. (See, for example, U.S. Pat. No. 5,783,799, issued to Geissler, Jul. 21, 1998 and U.S. Pat. No. 6,815,639, issued to Geissler, Nov. 9, 2004, both of which are hereby incorporated by reference). Typically, the rectified voltage is provided to a bus (i.e., a conductor or conductors that provides a fixed or varying potential to a variety of components), which is disposed across a capacitor bank. The converter then converts (inverts, boosts, bucks, etc) the bus to a different voltage and current. Some designs, such as U.S. Pat. No. 6,815,639, have a second bus which is further processed by the output circuit, and other designs, such as U.S. Pat. No. 5,783,799, do not.

It is also well know that welding power supply components can become hot during use. Components can be cooled by blowing air past them, but it is also known that blowing air can bring particles past sensitive components, such as integrated circuits, switches, etc., which could damage them. Thus, there are competing concerns—cooling components and keeping components safe from dirt, etc. One known design addresses these competing concerns is shown in U.S. Pat. No. 5,642,260, issued to Sigl, Jun. 24, 1997. That design places heat sinks in a wind tunnel and the sensitive components outside of the wind tunnel.

Higher output welding-type power supplies have a bus bar that also gets very hot. Generally, as the current output rises, the bus bar must be able to dissipate more heat. Prior art designs do not adequately address the design of bus bars to reduce heat so that they do not need to have air blown past them. Bus bar(s), as used herein, can refer to one bar (or bar at one potential), or multiple bars at different potentials, and bar refers to the conductor, not a particular shape).

Accordingly, a welding-type power supply that has a bus bar that can be used at high current without overheating is desirable. Preferably the bus will not require forced air (or other fluid) cooling.

SUMMARY OF THE PRESENT INVENTION

According to a first aspect of the invention a bus includes two conductive plates and an insulator plate abutting and between them.

The bus is part of a welding-type power supply according to another aspect of the invention. The power supply includes an input circuit, the bus, and a switched circuit.

A welding-type power supply includes an input circuit, a laminated bus, a switched circuit, and an output circuit according to a third aspect of the invention.

The input circuit includes a rectifier and/or the switched circuit includes a converter in various embodiments.

One of the conductive plates is electrically connected to a first terminal of a capacitor, and the other conductive plate is electrically connected to a second terminal of the capacitor, in one embodiment.

One of the conductive plates electrically connected to a first terminal of a switch, and the other conductive plate is electrically connected to a second switch terminal of the switch, in another embodiment.

One conductive plate is electrically connected to a first terminal of a rectifier, and the second conductive plate is electrically connected to a second terminal of the rectifier, in yet another embodiment.

The switched circuit includes at least one switch in the housing, and the switch is thermally connected to a heat sink outside the housing, and/or the capacitors are outside the housing in other embodiments.

The insulator plate and/or conductive plates have ratios of surface area to thickness of at least 200:1, or at least 400:1 in various embodiments The bus is disposed in a housing having no forced fluid flow therethrough in another embodiment.

According to a fourth aspect of the invention, a welding-type power supply includes an input circuit, including a rectifier, a bus, a switched circuit, and an output circuit. The connection to the switched circuit bus includes two conductive layers separated by an insulating layer. The bus is disposed in a housing having no forced fluid flow therethrough. The capacitor is outside the housing. The switch is thermally connected to a heat sink outside the housing; and the switch is inside the housing.

Other principal features and advantages of the invention will become apparent to those skilled in the art upon review of the following drawings, the detailed description and the appended claims.

Figure 1:
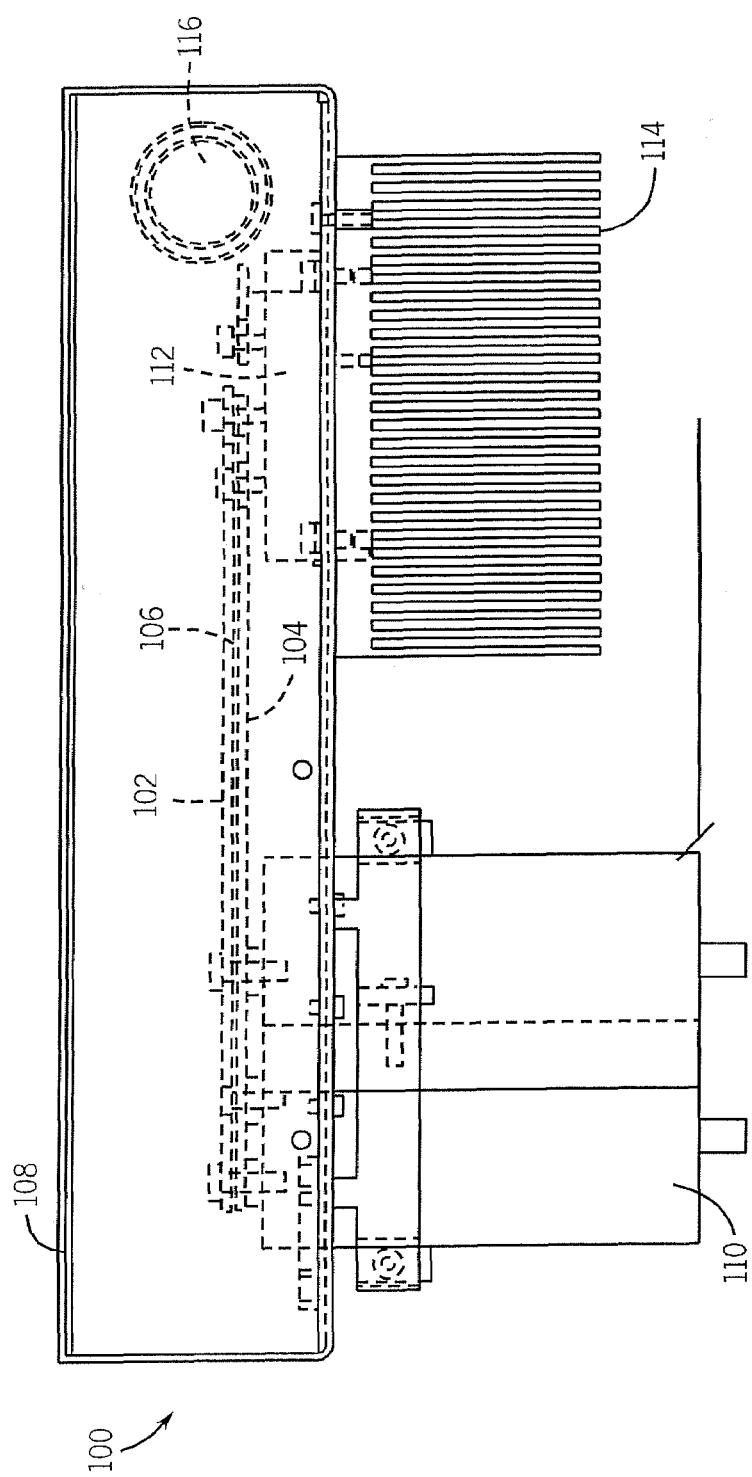
FIG. 1 is a side view of a bus and associated components in accordance with the preferred embodiment.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular design, it should be understood at the outset that the invention can also be implemented with other circuits, power supplies, components and configurations.

Generally, the invention provides for a welding-type power supply with a laminated bus, wherein the layers include an insulator plate sandwiched between two bus bars, preferably in the shape of plates. The bus bars are at different potentials in operations, and the bus voltage is the voltage difference across the bars. Laminated bus, as used herein includes a bus comprised of layers in a fixed relation to one another. They can be fixed with adhesive, fasteners, etc. Insulator plate, as used herein, includes an insulating material where the surface area is large relative to the thickness. Conductive plate, as used herein, includes a conductor having a surface area large relative to the thickness.

Figure 2:
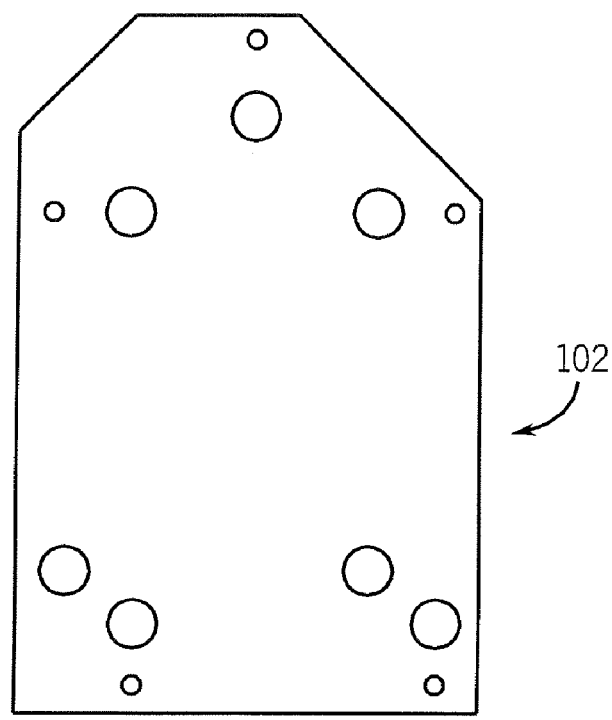
FIG. 2 is a top view of a conductive plate of a bus in accordance with the preferred embodiment.

Referring now to FIGS. 1-2, a bus 100 in accordance with the preferred embodiment includes a conductive plate 102, an insulator plate 104 and a conductive plate 106 abutting against one another. They are mounted in a housing or box 108. Plate 102 is electrically connected to one terminal of a capacitor bank 110, and to one terminal of parallel switches 112. Capacitor, as used herein, includes one or more capacitors in parallel or series, and switch, as used herein, includes one or more capacitors in parallel or series. Box, as used herein, includes an enclosure, but need not be a particular shape.

Plates 102-106 include holes therethrough for mounting screws (or other fasteners) to attach to the terminals of and/or to affix the plates in position, as can be seen in FIG. 2, which is a top view of plate 102. Plate 102 has a long dimension of over about 11 inches and a width of over about 7 inches. The surface area is about 70 square inches. The thickness or depth of plate 102 is preferably about 0.125 inches. Thus, the ratio between the surface area (sq. in.) and thickness (in) is about 560 (the ratio is different for different measuring units). The greater surface area allows for less heat because there is less impedance, and thus less heating. The thin profile saves cost and weight, but cannot be so thin as to increase heating (most current is carried near the surface of a conductor). Various embodiments provide for ratios of 200:1 and 400:1. Plates 102 and 106 have similar holes therethrough, and similar dimensions and ratios. (Thickness, as used herein, refers to the dimension perpendicular to the larger surfaces of the plate.)

Switches 112 are preferably IGBTs, but may be any kind of switch. While the terminals of capacitors 110 are inside housing 108, the actual capacitors are outside housing 108. Also, switches 112 are inside housing 108, but are thermally connected to a heat sink 114 which is outside housing 108. Housing 108 is enclosed and does not have forced fluid flow (gas flow or liquid flow, e.g.). Because heat sink 114 and capacitors 110 are outside housing 108, a fan can force air flow past these hot components, and provide the necessary cooling. The design of plates 102 and 106 allow for sufficiently reduced heating to avoid the need for having airflow past the bus bars. Thus, housing 108 may be enclosed, protecting the components therein.

Housing 108 may be sealed, or it may have holes for cables, etc. Sealing provides greater protection from dirt, etc., but also makes access more difficult. Housing 108 may be comprised of metal, plastic or other preferably rigid material.

Figure 3:
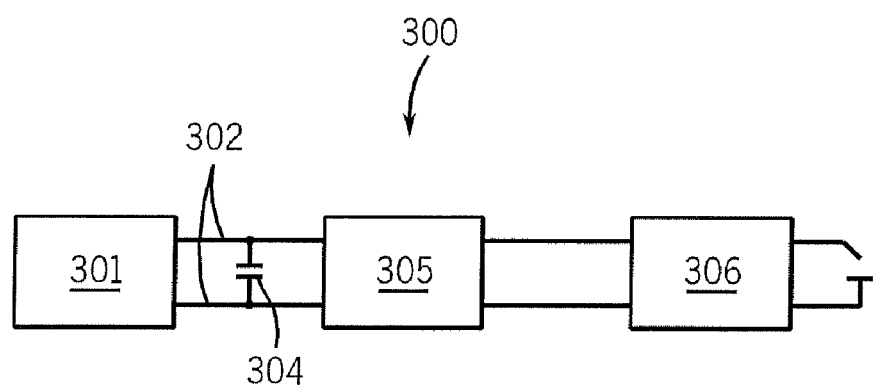
FIG. 3 is a block diagram of a welding-type power supply in accordance with the preferred embodiment.

Referring now to FIG. 3, a block diagram of a welding-type power supply 300 in accordance with the preferred embodiment includes an input circuit 301, a bus 302, capacitors 304, a switched circuit 305, and an output circuit 306. Input circuit 301 includes a rectifier in the preferred embodiment. Switched circuit 305 switches the power form the bus, and is preferably a converter, such as a chopper, inverter, boost, buck, resonant, cuk, etc. Output circuit preferably includes a smoothing inductor, and, in some embodiments, a rectifier. Other topologies may be used to implement the invention.

Numerous modifications may be made to the present invention which still fall within the intended scope hereof. Thus, it should be apparent that there has been provided in accordance with the present invention a method and apparatus for welding that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A bus for a welding type power supply, comprising:
    a first conductive plate having a first surface;
    an insulator plate, having a first insulator surface disposed in an abutting relationship with the first bus surface, and further having a second surface;
    and a second conductive plate having a second bus surface disposed in an abutting relationship with the second insulator surface; and
    wherein the first conductive plate has a first conductive thickness extending perpendicular to the first surface, and the first surface has a first conductive surface area, wherein the ratio of the first conductive surface area in square inches to the first conductive thickness in inches is at least 200:1.

2. The bus of claim 1, wherein the first conductive plate is electrically connected to a first terminal of a capacitor, and the second conductive plate is electrically connected to a second terminal of the capacitor.

3. The bus of claim 2, wherein the first conductive plate is further electrically connected to a first terminal of a switch, and the second conductive plate is electrically connected to a second switch terminal of the switch.

4. The bus of claim 3, wherein the first conductive plate is electrically connected to a first terminal of a rectifier, and the second conductive plate is electrically connected to a second terminal of the rectifier.

5. The bus of claim 1, wherein the second conductive plate has a second conductive thickness extending perpendicular to second surface, and the second surface has a second conductive surface area, wherein the ratio of the second conductive surface area in square inches to the second conductive thickness in inches is at least 200:1.

6. The bus of claim 1, wherein the ratio of the first conductive surface area in square inches to the first conductive thickness in inches is at least 400:1.

7. The bus of claim 6, wherein the second conductive plate has a second conductive thickness extending perpendicular to second surface, and the second surface has a second conductive surface area, wherein the ratio of the second conductive surface area in square inches to the second conductive thickness in inches is at least 400:1.

8. The bus of claim 1, wherein the bus is disposed in a housing having no forced fluid flow therethrough.

9. A welding-type power supply, comprising:
    an input circuit for receiving input power;
    a bus, connected to the input circuit and across at least one capacitor, wherein the bus is comprised of a first conductive plate having a first surface, an insulator plate, having a first insulator surface disposed in an abutting relationship with the first bus surface, and further having a second surface, and a second conductive plate having a second bus surface disposed in an abutting relationship with the second insulator surface, wherein the first conductive plate has a first conductive thickness extending perpendicular to the first surface, and the first surface has a first conductive surface area, wherein the ratio of the first conductive surface area in square inches to the first conductive thickness in inches is at least 200:1;

a switched circuit, connected to the bus; and an output circuit connected to the switched circuit.

10. The welding-type power supply bus of claim 9 wherein the first conductive plate is electrically connected to a first terminal of a capacitor, and the second conductive plate is electrically connected to a second terminal of the capacitor.

11. The welding-type power supply of claim 10, wherein the input circuit includes a rectifier.

12. The welding-type power supply of claim 11, wherein the switched circuit includes a converter.

13. The welding-type power supply of claim 9, wherein the insulator plate has a thickness extending between the first insulator surface and the second insulator surface, and further wherein the first insulator surface has a surface area, wherein the ratio of the surface area in square inches to the thickness in inches is at least 200:1.

14. The welding-type power supply of claim 13, wherein the second conductive plate has a second conductive thickness extending perpendicular to second surface, and the second surface has a second conductive surface area, wherein the ratio of the second conductive surface area in square inches to the second conductive thickness in inches is at least 200:1.

15. The welding-type power supply of claim 13, wherein the first conductive plate has a first conductive thickness extending perpendicular to the first surface, and the first surface has a first conductive surface area, wherein the ratio of the first conductive surface area in square inches to the first conductive thickness in inches is at least 400:1.

16. The welding-type power supply of claim 15, wherein the insulator plate has a thickness extending between the first insulator surface and the second insulator surface, and further wherein the first insulator surface has a surface area, wherein the ratio of the surface area in square inches to the thickness in inches is at least 400:1.

17. The welding-type power supply of claim 15, wherein the second conductive plate has a second conductive thickness extending perpendicular to second surface, and the second surface has a second conductive surface area, wherein the ratio of the second conductive surface area in square inches to the second conductive thickness in inches is at least 400:1.

18. The welding-type power supply of claim 9, wherein the bus is disposed in a housing having no forced fluid flow therethrough.

19. A welding-type power supply, comprising:

an input circuit, including a rectifier, for receiving input power;

a bus, including two conductive layers separated by an insulating layer, connected to the input circuit and across at least one capacitor, wherein the bus is disposed in a housing having no forced fluid flow therethrough, and the at least one capacitor is disposed outside the housing;

a switched circuit, including at least one switch is disposed in the housing, connected to the bus, and wherein the switch is thermally connected to a heat sink outside the housing; and an output circuit connected to the switched circuit.

20. A welding-type power supply, comprising:

input means for receiving input power;

a bus, connected to the input means and across at least one capacitor, wherein the bus is comprised of a first conductive plate having a first surface, an insulator plate, having a first insulator surface disposed in an abutting relationship with the first bus surface, and further having a second surface, and a second conductive plate having a second bus surface disposed in an abutting relationship with the second insulator surface, wherein the first conductive plate has a first conductive thickness extending perpendicular to the first surface, and the first surface has a first conductive surface area, wherein the ratio of the first conductive surface area in square inches to the first conductive thickness in inches is at least 200:1;

switching means for switching across the bus; and output means for receiving power from the switching means and providing output power.

21. The welding-type power supply bus of claim 20, wherein the first conductive plate is electrically connected to a first terminal of a capacitor, and the second conductive plate is electrically connected to a second terminal of the capacitor.

22. The welding-type power supply of claim 21, wherein the insulator plate has a thickness extending between the first insulator surface and the second insulator surface, and further wherein the first insulator surface has a surface area, wherein the ratio of the surface area in square inches to the thickness in inches is at least 200:1.

23. The welding-type power supply of claim 22, wherein the second conductive plate has a second conductive thickness extending perpendicular to second surface, and the second surface has a second conductive surface area, wherein the ratio of the second conductive surface area in square inches to the second conductive thickness in inches is at least 200:1.

24. The welding-type power supply of claim 23, wherein the first conductive plate has a first conductive thickness extending perpendicular to the first surface, and the first surface has a first conductive surface area, wherein the ratio of the first conductive surface area in square inches to the first conductive thickness in inches is at least 400:1.

25. The welding-type power supply of claim 23, wherein the bus is disposed in a housing having no forced fluid flow therethrough.

26. The welding-type power supply of claim 22, wherein the insulator plate has a thickness extending between the first insulator surface and the second insulator surface, and further wherein the first insulator surface has a surface area, wherein the ratio of the surface area in square inches to the thickness in inches is at least 400:1.

27. The welding-type power supply of claim 26, wherein the second conductive plate has a second conductive thickness extending perpendicular to second surface, and the second surface has a second conductive surface area, wherein the ratio of the second conductive surface area in square inches to the second conductive thickness in inches is at least 400:1.

28. A welding-type power supply, comprising:

input means for rectifying input power;

bus means, including two conductive layers separated by an insulating layer, connected to the input means and across at least one capacitor, for maintaining a voltage across the capacitor;

housing means for housing the bus means and for preventing forced fluid flow across the bus means, wherein the at least one capacitor is disposed outside the housing means;

switch means for switching power from the bus means, wherein the switch means is disposed in the housing means and connected to the bus means, and wherein the switch means is thermally connected to a heat sink outside the housing means; and output means for receiving power from the switch means and providing output power.

* * * * *